Nov. 12, 1935. C. M. UNDERWOOD Re. 19,758

METHOD OF AND APPARATUS FOR COATING STRANDS

Original Filed Jan. 9, 1929

INVENTOR
C. M. UNDERWOOD
BY H. A. Whitehorn
ATTORNEY

Reissued Nov. 12, 1935 Re. 19,758

UNITED STATES PATENT OFFICE 19,758

METHOD OF AND APPARATUS FOR COATING STRANDS

Carl M. Underwood, Washington, D. C., assignor to Western Electric Company, Incorporated, New York, N. Y., a corporation of New York Original No. 1,981,130, dated November 20, 1934, Serial No. 608,041, April 28, 1932, which is a continuation of application January 9, 1929, Serial No. 331,362. Application for reissue February 19, 1935, Serial No. 7,263

23 Claims. (Cl. 91—12.2)

This invention relates to a method of and apparatus for coating strands, and more particularly to an improved method of and apparatus for applying a coating of tin or other metal to wire, and this application is a continuation of my copending application, Serial No. 331,362, filed January 9, 1929.

Objects of the invention are to provide an improved method of and apparatus for rapidly applying a thin, uniform coating to a strand.

In one embodiment of the present invention the coated strand or wire is given a preliminary wiping by being passed through a die of substantially greater diameter than the strand or wire core, which is then wiped by a gas, such as superheated steam passing longitudinally thereof for a substantial distance at a high velocity and in a direction opposite to the movement of the wire. By the arrangement of parts more specifically described hereinafter, the movement of the gas is controlled so that the surplus coating material is removed, leaving a coating which does not vary in thickness with variations in the diameter of the strand. By the use of the method and apparatus herein disclosed, a uniform coating may be obtained, and the thickness of the coating may be accurately adjusted to any desired amount.

The invention will be more fully understood from the following description, taken in connection with the appended drawing, in which Fig. 1 is a diagrammatic elevation, partially in section, of a strand coating apparatus embodying the invention, and which may be used in practicing the invention;

Figure 3:
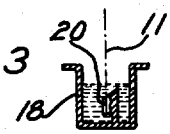
Fig. 3 is a sectional view taken on line 3—3 of Fig. 1.

In the drawing, which illustrates a preferred form of the invention, reference numeral 10 designates a reel upon which is wound a supply of strand material such as wire 11 to be coated. From reel 10 the strand material passes over pulley 12 to a fluxing bath 13 which is designed to remove impurities from the surface of the strand and prepare it to receive a coating. The construction and composition of the bath 13 will depend largely upon the material to be treated, but a solution of zinc chloride, ammonium chloride and sulphuric acid will be found satisfactory where copper wire is to be coated with tin.

From bath 13 the strand passes over a pulley 15 to a coating bath 16 consisting of liquid coating material, such as molten tin or other metal, to be applied to the strand. The coating material is contained in a tank 17 which may be heated by any suitable means (not shown) and which has a bracket 18 removably secured therein and provided with a lateral member 20 under which the strand passes during its immersion in the bath.

Figure 4:
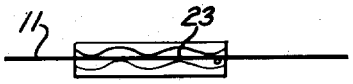
Fig. 4 is a plan view of a cooling element.
Figure 1:
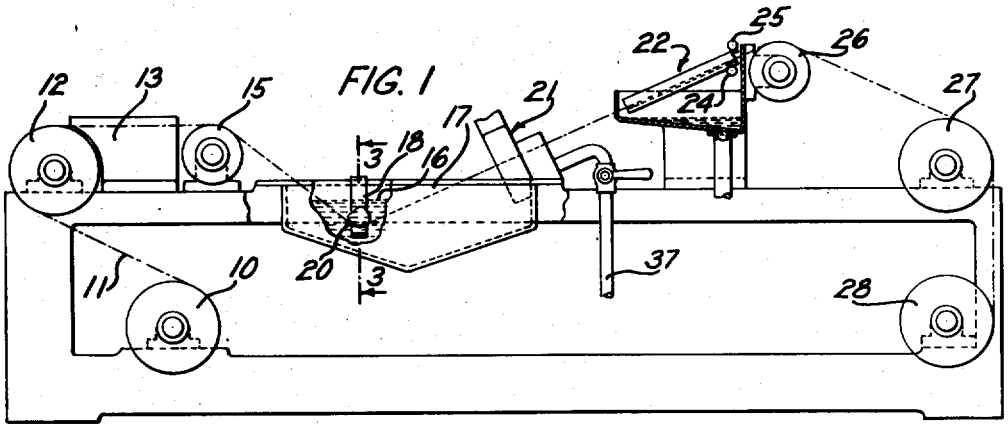

From the coating bath the strand, having an excess of coating material applied thereto, next passes to the wiping mechanism 21, where the excess coating material is removed, as described in detail hereinafter, and thence passes to a cooling device 22. The cooling device has an inclined tortuous groove 23 (Fig. 4) through which the strand passes, the groove being shaped to cause turbulence in a stream of water which is supplied to the groove from a pipe 24 having its outlet near the upper end of the groove and thus prevent the formation of an envelope of steam about the strand, which envelope would impair the cooling action of the water. The strand is thereby brought into contact with cool water and chilled, after which it may be dried by means of a blast of air from a pipe 25 and passed over a pulley 26 and a capstan 27 to a driven take-up reel 28.

Figure 2:
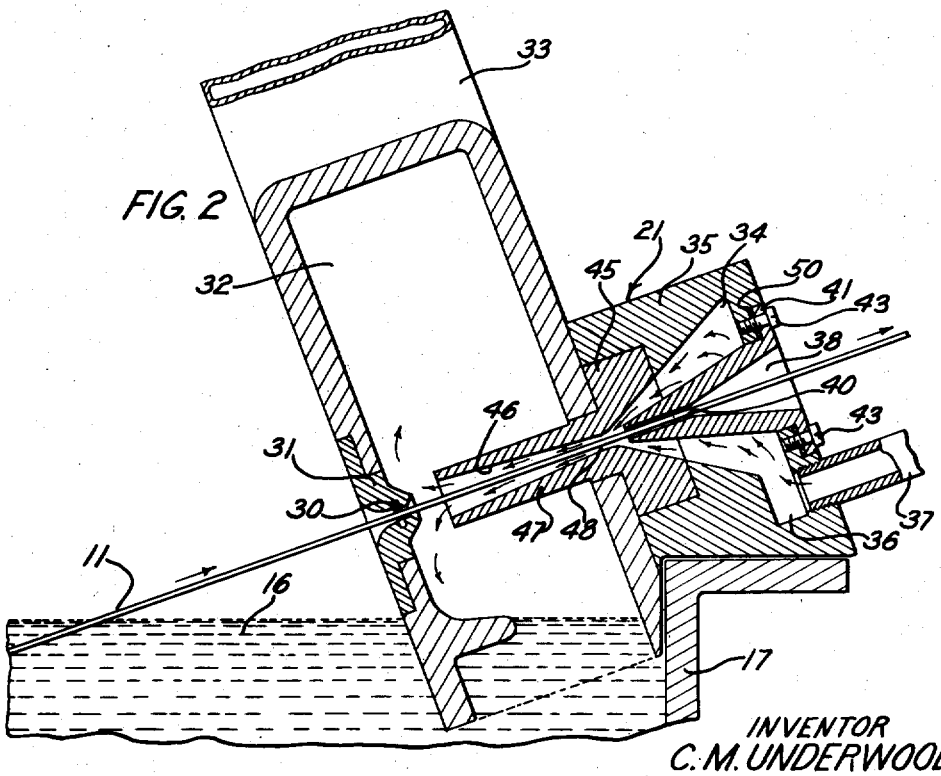
Fig. 2 is an enlarged sectional view of a wiping mechanism embodying the invention.

The wiping mechanism 21, shown in detail in Fig. 2, is mounted at the edge of tank 17 and comprises a die 30 of the wire-drawing type but of substantially greater diameter than the wire 11, thus allowing a substantial clearance between the wire and die so that when the wire passes through the die from the bath 16 only the gross excess of coating material is removed by the die. The die, which may be of diamond or other hard material, is mounted in a setting 31 which is inserted in the wall of a separating chamber 32 having its lower open end immersed in the molten metal of the coating bath 16, the chamber being provided with a gas outlet 33 at the upper portion thereof.

A chamber 34 is formed in a block 35 positioned forwardly of the separating chamber 32 and is of a generally conical shape except at the portion indicated as 36, where it is enlarged to provide an inlet from a conduit 37 which supplies superheated steam or other gas thereto. A hollow conical member 38 extends within the chamber 34 and is provided at its tip with an aperture 40 adapted to permit passage of the strand 11 therethrough without friction, sufficient clearance being allowed so that the strand normally does not bear against the sides of the aperture. The outer portion of member 38 is formed with a flange 41 which seats within a recess formed in block 35 and is held in position by screws 43.

A nozzle member 45 has one of its ends seated in a recess in block 35 and its other end extending into the separating chamber 32 and is provided with an internally flared or conical bore 46 so positioned and shaped as to receive the wire 11 and form a nozzle 47 for expanding the gas admitted through conduit 37. The die 30, in addition to its wiping function, also serves to center the wire with respect to the nozzle 47 and member 38 to prevent its contacting with the inner surfaces of said nozzle and member, since any contact between the wire and the inner surfaces would cause coating material to be deposited thereon, and would also prevent the gas from effecting an equal wiping action on all sides of the wire.

The wiping mechanism just described is designed to utilize superheated steam or other gas, preferably at a pressure of several atmospheres. Such gas, entering the chamber 34 from conduit 37, passes through the narrowest portion 48 of the nozzle and thereby tends to produce a suction through aperture 40 and to draw air from the exterior of the wiping mechanism. Such an influx of air is undesirable since it prematurely chills the coating material and causes it to congeal on the strand and may be prevented by moving member 38 outwardly, fixing it in its adjusted position by means of removable washers 50. The ideal condition of adjustment is reached when, at a given pressure of gas, there is no flow in either direction through aperture 40, but this condition cannot be readily maintained in practice so it will usually be found best to so adjust member 38 that a slight outward flow of gas takes place through aperture 40. An approximate balance between the tendency of the air to flow inward and the tendency of the gas to flow outward through aperture 40 may be readily obtained, and where a constant steam pressure is used in the wiping mechanism, the adjustment once made need never be changed.

From portion 48 to the end of the nozzle, the velocity of the steam increases due to its expansion, so that the strand is subjected to a wiping action by the movement of steam at a high velocity longitudinally of the wire for a substantial distance. The excess coating material remaining on the surface of the strand after its passage through die 30 is thereby removed and broken up into droplets which are separated from the steam by gravity in chamber 32 and returned to the bath 16. The thickness of the coating remaining on the strand may be controlled by varying either the speed of the wire or the pressure of the gas or both, a higher speed tending to produce a heavier coating, while a higher gas pressure or temperature tends to produce a lighter coating. It will be seen that in this construction the diameter of the wire being coated may vary widely without interfering with the efficient wiping action of the apparatus, and that any foreign particles which may be present in the coating material will be entirely removed from the wire rather than being allowed to accumulate at the wiper or die.

While the invention has been described with particular reference to the coating of wire with tin, using superheated steam as a pressure gas, it will be understood that it may be applied to the coating of a wide variety of strand materials with an equally wide variety of coating materials, and that other gases may be used in place of the superheated steam. The expressions "strand" or "strand material", as used in the specification and claims, are intended to embrace any elongated material, such as strips, sheets, rods, or the like.

What is claimed is:

1. The method of coating a strand which comprises applying thereto an amount of coating material in excess of that desired in the finished product, removing a portion of the excess coating mechanically, and subsequently removing the remainder of the excess coating by passing a gas longitudinally of the strand at high velocity for a substantial distance.

2. In an apparatus for coating moving strands, means to apply an excess of liquid coating to a longitudinally moving strand, a liquid and gas separating chamber through which the strand passes, a scraping die mounted in the chamber and surrounding the strand, an expansion nozzle mounted in the chamber and surrounding the strand, and means to supply gas under high pressure to the nozzle, the gas being free from rotational movement.

3. In an apparatus for stripping excess coating from a strand moving longitudinally therethrough, a chamber surrounding the strand and having axially arranged a strand inlet and a strand outlet through which the strand passes, a gas inlet communicating with the chamber, and an expansion nozzle surrounding the strand in axial alignment with the chamber and forming a continuation of the strand inlet thereto.

4. In an apparatus for stripping excess coating from a strand moving longitudinally therethrough, an expansion nozzle surrounding the strand, an annular chamber located in axial alignment therewith and communicating therewith, and a gas supply inlet communicating with the chamber.

5. In an apparatus for stripping excess coating from a strand moving longitudinally therethrough, an annularly conoidal chamber, whose inner and outer side walls surround the strand, and which has apical strand inlet and strand outlet apertures, a gas inlet communicating with the chamber, and an expansion nozzle surrounding the strand in axial alignment with the chamber and communicating with the apical strand inlet thereof.

6. In an apparatus for stripping excess coating from a strand moving longitudinally therethrough, an annularly conoidal chamber, whose inner and outer side walls surround the strand, and which has apical strand inlet and strand outlet apertures, a gas inlet communicating with the chamber, an expansion nozzle surrounding the strand in axial alignment with the chamber and communicating with the apical strand inlet thereof, and a scraping die surrounding the strand and preceding the nozzle in the motion of the strand.

7. In an apparatus for stripping excess coating from a strand moving longitudinally therethrough, an expansion nozzle surrounding the strand, an annular chamber located in axial alignment therewith and communicating therewith, a gas supply inlet communicating with the chamber, and means preceding the nozzle in the motion of the strand to remove a portion of the excess coating therefrom.

8. In an apparatus for coating material, means for applying to the material a coating in excess of that desired in the finished product, means for applying a stream of gas free from rotational movement to the strand to remove the excess coating, and an expansion tube for holding the gas in contact with the coating.

9. In an apparatus for coating material, means for applying to the material a coating in excess of that desired in the finished product, a preliminary die having an opening of greater cross-sectional dimensions than the material being coated for removing a portion of the excess coating, and means for applying a stream of gas longitudinally of the surface of the material after passage thereof through said die, said means for applying the stream of gas having a radial inlet to prevent rotational movement of the gas.

10. In an apparatus for coating material, means for holding a supply of coating material, means for applying an excess of liquid coating to the material, means for applying a heated stream of gas to the material for removing the excess coating, and a liquid and gas separating chamber for receiving the gas and the removed liquid, said chamber communicating with said supply to return the removed material thereto and having an outlet for the escape of the gas.

11. In an apparatus for coating material, means for applying an excess of liquid coating to the material, means for applying a heated stream of gas to the material for removing a portion of the excess coating, a chamber for receiving the stream of gas and the removed coating, and a die at the entrance of the chamber having an opening of a contour similar to the material being coated for preliminarily removing a portion of the excess coating.

12. In an apparatus for coating material, means for applying an excess of liquid coating to the material, a die for removing a portion of the excess coating, means for applying a heated gas to the material for removing the remainder of the excess material, said die being disposed in the path of the heated gas to heat the die.

13. In an apparatus for coating material, means for applying to the material a coating in excess of that desired in the finished product, a die having a fixed die opening for removing a portion of the excess coating, and means for applying a stream of gas to the material to remove the remainder of the excess coating.

14. In an apparatus for coating moving material, means for applying to the material an amount of coating in excess of that desired in the finished product, mechanical means having an aperture slightly larger than the cross-section of the material for removing a portion of the excess coating, and means for applying a stream of gas to the material to remove the remainder of the excess coating.

15. In an apparatus for coating material, means for applying to the material an amount of coating in excess of that desired in the finished product, a wiping member for removing a portion of the excess coating, an expansion tube, and means for directing steam through the tube to remove the remainder of the excess coating.

16. In an apparatus for coating material, a coating bath, a tube adapted to permit the passage therethrough of the material coated in the bath, a wiping die adapted to guide the material during its passage through the tube and adapted to remove a portion of the excess coating from the strand, and means for supplying a heated expansible gas to said tube to remove the remainder of the excess coating from the material.

17. In an apparatus for coating strands, means for applying to a strand an amount of coating material in excess of that desired in the finished product, means for applying a stream of heated gas to the strand, and a tube having an elongated, conical opening therethrough for holding the stream of heated gas in contact with the strand to wipe the coating thereon.

18. In an apparatus for coating a strand, means for applying to the strand a coating in excess of that desired in the finished product, means for applying a stream of gas to the strand, and a tube for expanding the gas and moving it along the strand to remove the excess material.

19. In an apparatus for coating material, means for passing the material through a bath of molten metal and in an upward direction through the surface of the bath, means closely adjacent to the bath for passing superheated steam along the surface of said material in a direction toward said bath, and a shield surrounding said material in the path of said steam to prevent the direct impingement thereof on the bath of molten metal.

20. In an apparatus for coating material, means for passing material from a point within a bath of molten metal to a remote point where its direction is changed, and the following means operating on the straight portion of the material in the order set forth, namely a mechanical wiper, a steam wiper and a cooling device.

21. In an apparatus for coating moving material, means for applying to the material an amount of coating material in excess of that desired in the finished product, mechanical means for removing excess coating material, and means for applying a hot gaseous medium to the coating material at points remote from all positions where the material has physical contact with the apparatus to render the coating uniform.

22. In an apparatus for coating moving material, means for applying to the material an amount of coating material in excess of that desired in the finished product, mechanical means for removing excess coating material, means for applying a hot gaseous medium to the coating material, and an elongated passage for retaining said medium about the coating material for a substantial distance along the length of the material being coated to render the coating uniform.

23. An apparatus for coating an elongated body, comprising means for applying a molten metal coating to the body, means for applying a hot gaseous medium to the body, and means extending longitudinally of the body for retaining said hot gaseous medium about the body for a substantial distance.

CARL M. UNDERWOOD.